(12) United States Patent
Imai

(10) Patent No.: US 9,126,390 B2
(45) Date of Patent: Sep. 8, 2015

(54) STRETCH COMPOSITE FABRIC AND EXPANDED POROUS POLYTETRAFLUOROETHYLENE FILM

(71) Applicant: W. L. Gore & Associates, Co., Ltd., Tokyo (JP)

(72) Inventor: Takashi Imai, Okayama (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 0 days.

(21) Appl. No.: 13/826,295

(22) Filed: Mar. 14, 2013

(65) Prior Publication Data

US 2013/0192748 A1    Aug. 1, 2013

Related U.S. Application Data

(62) Division of application No. 12/304,180, filed on May 19, 2009.

(30) Foreign Application Priority Data

Sep. 20, 2005    (JP) ................................. 2005-272803
Sep. 20, 2006    (WO) .................. PCT/JP2006/318644

(51) Int. Cl.
*B29C 65/52*    (2006.01)
*B32B 37/18*    (2006.01)
(Continued)

(52) U.S. Cl.
CPC ............ *B32B 38/0012* (2013.01); *A41D 27/24* (2013.01); *B29C 65/5021* (2013.01);
(Continued)

(58) Field of Classification Search
CPC ...... B32B 5/02; B32B 27/12; B32B 38/0012; B29C 65/10; B29C 65/4815; B29C 65/483; B29C 65/5021; B29C 65/5024; B29C 65/5042; B29C 66/112; B29C 66/1142; B29C 66/135; B29C 66/43; B29C 66/7292; B29C 66/8612; B29C 66/9141; B29C 66/91431; B29C 66/919; B29C 66/9534; D03D 3/005; D03D 13/008; D03D 15/00; D03D 15/0077; A41D 27/24; C09J 7/0296; C09J 2400/263; C09J 2427/006; C09J 2475/00; Y10T 428/2405; D10B 2201/02; D10B 2201/04; D10B 2211/02; D10B 2211/04; D10B 2321/10; D10B 2331/04; D10B 2501/00; D10B 2505/18; B29L 2009/00; C08G 2170/20; C08G 2190/00
USPC ................ 156/229, 307.1, 307.3, 307.7, 324; 442/76, 79, 85, 86, 104, 105
See application file for complete search history.

(56) References Cited

U.S. PATENT DOCUMENTS 3,953,566 A    4/1976    Gore
4,443,511 A    4/1984    Worden et al.
(Continued)

FOREIGN PATENT DOCUMENTS

JP    57-34946    2/1982
JP    59-187845    10/1984
(Continued)

*Primary Examiner* — Sing P Chan
(74) *Attorney, Agent, or Firm* — Amy L. Miller

(57) ABSTRACT

A stretch composite fabric comprises a sintered expanded porous polytetrafluoroethylene film and a stretch cloth laminated to each other while maintaining a flat state. The stretch composite fabric has a tensile stress at 10% elongation, as measured in at least one direction, of 1.8 N/15 mm or less. When a 5 cm-width test piece of the stretch composite fabric is stretched in a length direction under a load of 300 g and then released from the stress, an elongation recovery R of the stretch composite fabric, which is given by the following equation, is preferably 70% or more. R=(L2−L3)/(L2−L1)× 100 (In the equation, L1, L2, and L3 represent the lengths of the composite fabric before the load is applied, when the load is applied, and after the load is removed, respectively.)

6 Claims, 3 Drawing Sheets

(51) Int. Cl.
*B32B 38/18* (2006.01)
*B32B 43/00* (2006.01)
*C09J 5/02* (2006.01)
*B32B 38/00* (2006.01)
*A41D 27/24* (2006.01)
*B29C 65/50* (2006.01)
*B32B 5/02* (2006.01)
*B32B 27/12* (2006.01)
*C09J 7/02* (2006.01)
*D03D 3/00* (2006.01)
*D03D 13/00* (2006.01)
*D03D 15/00* (2006.01)
*B29C 65/00* (2006.01)
*B29L 9/00* (2006.01)
*B29C 65/10* (2006.01)
*B29C 65/48* (2006.01)

(52) U.S. Cl.
CPC ......... *B29C65/5028* (2013.01); *B29C 65/5042* (2013.01); *B32B 5/02* (2013.01); *B32B 27/12* (2013.01); *C09J 7/0296* (2013.01); *D03D 3/005* (2013.01); *D03D 13/008* (2013.01); *D03D 15/00* (2013.01); *D03D 15/0077* (2013.01); *B29C 65/10* (2013.01); *B29C 65/483* (2013.01); *B29C 65/4815* (2013.01); *B29C 66/112* (2013.01); *B29C 66/1142* (2013.01); *B29C 66/135* (2013.01); *B29C 66/43* (2013.01); *B29C 66/7292* (2013.01); *B29C 66/8612* (2013.01); *B29C 66/919* (2013.01); *B29C 66/9141* (2013.01); *B29C 66/91431* (2013.01); *B29C 66/9534* (2013.01); *B29L 2009/00* (2013.01); *C08G 2170/20* (2013.01); *C08G 2190/00* (2013.01); *C09J 2400/263* (2013.01); *C09J 2427/006* (2013.01); *C09J 2475/00* (2013.01); *D10B 2201/02* (2013.01); *D10B 2201/04* (2013.01); *D10B 2211/02* (2013.01); *D10B 2211/04* (2013.01); *D10B 2321/10* (2013.01); *D10B 2331/02* (2013.01); *D10B 2331/04* (2013.01); *D10B 2501/00* (2013.01); *D10B 2505/18* (2013.01); *Y10T 428/2405* (2015.01)

(56) References Cited

U.S. PATENT DOCUMENTS

| | | | |
|---|---|---|---|
| 4,764,560 | A | 8/1988 | Mitchell |
| 4,877,661 | A | 10/1989 | House et al. |
| 5,529,830 | A | 6/1996 | Dutta et al. |
| 6,218,000 | B1 | 4/2001 | Rudolf et al. |
| 6,534,580 | B1 * | 3/2003 | Hanada et al. ............ 524/377 |
| 7,572,744 | B1 | 8/2009 | Ikenaga et al. |
| 7,976,751 | B2 * | 7/2011 | Hayashi et al. ............ 264/127 |

FOREIGN PATENT DOCUMENTS

| | | |
|---|---|---|
| JP | 60-139444 | 7/1985 |
| JP | 61-137739 | 6/1986 |
| JP | 3-90352 | 4/1991 |
| JP | 7505588 | 6/1995 |
| JP | 9-500844 | 1/1997 |
| JP | 9-241421 | 9/1997 |
| KR | 10-1993-0002426 | 2/1993 |
| KR | 10-2000-0071391 | 11/2000 |
| WO | 1994/022928 | 10/1994 |

* cited by examiner

Stretching and shrinking direction

Stretching and shrinking direction

STRETCH COMPOSITE FABRIC AND EXPANDED POROUS POLYTETRAFLUOROETHYLENE FILM

CROSS REFERENCE TO RELATED APPLICATIONS

This application is a continuation of U.S. patent application Ser. No. 12/304,180 filed May 19, 2009, the entire contents of which are expressly incorporated herein by reference in its entirety.

1. TECHNICAL FIELD

The present invention relates to an expanded porous polytetrafluoroethylene film and a stretch composite fabric comprising this expanded porous polytetrafluoroethylene film and a stretch cloth laminated to each other.

2. BACKGROUND ART

A composite fabric comprising an expanded porous polytetrafluoroethylene (ePTFE) film and a cloth laminated to each other has been put to practical use as, for example, a clothing material excellent in moisture permeability and windbreak performance in the field of outdoor products and the like. Further, a composite fabric comprising a composite film having a waterproof property improved by applying a resin with moisture permeability to an ePTFE film and a cloth laminated to each other has also been put to practical use as, for example, a clothing material excellent in moisture permeability and waterproof property in the field of outdoor products and the like. A composite fabric comprising an ePTFE film alone is characterized by being excellent in moisture permeability and has been used as a material suitable for windbreakers or heavy winter clothes although the waterproof property of the composite fabric comprising an ePTFE film alone is inferior to that of a composite fabric comprising the composite film. In such composite fabrics, in order to increase a stretch property, a composite fabric comprising a composite film and a stretch cloth laminated to each other has also been known (Patent documents 1 and 2, etc.).

For example, in Patent document 1, a composite film comprising an expanded PTFE (i.e., sintered ePTFE) film and a hydrophilic elastomer layer provided by the technique described in U.S. Pat. No. 3,953,566, or a composite textile comprising this composite film and a fibrous outer layer (cloth) is stretched and released, whereby the stretch property and recovery property of this composite film or composite textile are increased. In this Patent document 1, the composite film or composite textile is stretched in one direction until a grip-to-grip distance of 9 inches becomes 18 inches (i.e., to about twice its original length), and at this time, necking occurs such that the sample width is decreased to about ⅜ to ½. When the present inventor made an additional test for this Patent document 1, the stretch property was not sufficient. Patent document 2 also describes that sintered PTFE as used in Patent document 1 "is poor in ductility because fibrils are fused to one another and interfibrillar slip does not occur" and points out that "the stretch property of the counterpart of the laminate is inhibited by the above-mentioned sintered PTFE and the stretch property of the laminate on the whole is hardly obtained".

Accordingly, Patent document 2 has proposed that PTFE is used without being sintered (unsintered as such). Patent document 2 describes that when a stretch resin is impregnated into an unsintered ePTFE film and retained therein, favorable restoring property and stretch property can be achieved. However, the unsintered ePTFE film to be used in this Patent document 2 has a low cohesive strength in a thickness direction, therefore, a delamination phenomenon is likely to occur. In order to avoid the occurrence of this delamination phenomenon, it has been proposed that a stretch resin is applied to one surface or both surfaces. However, when such a stretch resin is applied to one surface, a cohesive strength of a surface without application of the stretch resin is apparently lacking. Further, even when the stretch resin is applied to both surfaces, if pores remain in the inside of the ePTFE film, the cohesive strength at the region is lacking. In order to completely prevent the occurrence of the delamination phenomenon, it is necessary to completely impregnate the stretch resin into the inside of the ePTFE film, inevitably resulting in increasing the thickness of the resin layer and decreasing the moisture permeability.

Further, because the methods described in Patent documents 1 and 2 utilize the stretch property of a resin to be applied to ePTFE, the methods cannot be applied to a composite fabric comprising an ePTFE film alone.

As described above, it is difficult to achieve both stretch property and strength (cohesive strength) in the prior art. Accordingly, in Patent documents 3 to 5, a method of laminating an ePTFE composite film to a cloth is improved instead of improving the physical property of an ePTFE composite film. That is, in these Patent documents 3 to 5, a stretch cloth is laminated to an ePTFE composite film in a stretched state, and thereafter, the stretch cloth is shrunk. FIG. 1 is a schematic cross-sectional diagram of such a laminate. As shown in FIG. 1, in examples of Patent documents 3 to 5, a pleated structure in which an ePTFE composite film 1a is corrugated along the stretching and shrinking direction of a cloth 2 is adopted. By adopting this pleated structure, the ePTFE composite film 1a follows the stretching of the cloth while eliminating the pleats when the cloth is stretched, therefore, a stretching stress does not act on the ePTFE composite film 1a, and even if sintered ePTFE is used (even if a strength is secured), the stretch property is not sacrificed. When such a pleated structure is adopted, however, the ePTFE composite film 1a has a corrugated form, therefore, the aesthetic appearance of a laminate 3 is deteriorated. In addition, the laminate 3 is likely to be rubbed against other members at tops 10 of the corrugated pattern, and the laminate 3 is liable to be damaged. Further, a used amount of the ePTFE composite film per unit area of the laminate is increased, and the production cost is increased.

The present invention has been made in view of the circumstances as described above and has its object to establish a technique capable of increasing a strength and a stretch property of an ePTFE film without corrugating the film.

Patent document 1: JP-A-S59 (1984)-187845
Patent document 2: JP-A-S61 (1986)-137739
Patent document 3: JP-A-H03 (1991)-90352
Patent document 4: JP-A-S60 (1985)-139444
Patent document 5: JP-T-1409 (1997)-500844

DISCLOSURE OF THE INVENTION

The present inventor made intensive studies in order to achieve the above object, and as a result, the inventor found that when a sintered ePTFE film is subjected to a stretching treatment (elongation treatment) such that the area of the sintered ePTFE film is sufficiently extended and then shrunk, both the strength and the stretch property of the ePTFE film can be increased, and the ePTFE film does not have to be corrugated. Further, the inventor found that with regard to the above shrinking procedure, the ePTFE film may be shrunk by utilizing the shrinking force of the stretch cloth laminated to the ePTFE film or the ePTFE film may be shrunk by heat, and it is not necessary to impregnate ePTFE with an elastic resin, and thus, the present invention has been completed.

That is, the stretch composite fabric according to the invention has its gist that the stretch composite fabric comprises a sintered expanded porous polytetrafluoroethylene film and a stretch cloth laminated to each other while maintaining a flat state, and has a tensile stress at 100 elongation, as measured in at least one direction, of 1.8 N/15 mm or less. The flat state can be evaluated by a ratio ($L_T/L_W$) of a true length $L_T$ of the expanded porous polytetrafluoroethylene film to an apparent length (a length $L_W$ when the film is projected onto a flat surface parallel to the film surface) of the film, and the stretch composite fabric of the invention preferably has this ratio ($L_T/L_W$) of 1.2 or less. When a test piece cut out to a width of 5 cm is stretched in a length direction under a load of 300 g and then released from the stress, an elongation recovery R of the stretch composite fabric, which is given by the following equation, is preferably 70% or more.

$$R=(L2-L3)/(L2-L1)\times 100$$

(In the equation, R represents a recovery, L1 represents the length of the composite fabric before the load is applied, L2 represents the length of the composite fabric when the load is applied, and L3 represents the length of the composite fabric after the load is removed).

Further, when a test piece is cut out to a width of 5 cm from the stretch cloth to be used in the stretch composite fabric and is stretched in a length direction under a load of 300 g, an elongation E of the stretch cloth, which is given by the following equation, is preferably 30% or more.

$$E=(T2/T1-1)\times 100$$

(In the equation, E represents an elongation, T1 represents the length of the stretch cloth before the load is applied, and T2 represents the length of the stretch cloth when the load is applied).

An inner surface of pores of the expanded porous polytetrafluoroethylene may be coated with a water-repellent polymer and/or an oil-repellent polymer, and an elastomer resin layer may be formed on the expanded porous polytetrafluoroethylene film, and an outer exposed surface of the stretch cloth may be subjected to a water-repellent treatment.

The stretch composite fabric can be produced by laminating a sintered expanded porous polytetrafluoroethylene film to a stretch cloth, stretching the resulting laminate in a planar direction so as to increase the area of the laminate (for example, to 1.4 times or more), and shrinking the laminate by removing the stretching force. For example, the stretch composite fabric can be produced by stretching the laminate in a uniaxial direction while preventing the occurrence of necking, or by stretching the laminate in biaxial directions. It is recommended that the stretching and shrinking of the laminate are performed at a temperature of 220° C. or lower, and further, the shrinking of the laminate is performed at a temperature of 50° C. or higher.

The stretch composite fabric of the invention can be used in a fiber product.

In the invention, an expanded porous polytetrafluoroethylene film having an improved stretch property is also included, and this expanded porous polytetrafluoroethylene film is characterized by having been sintered and having a mass per unit area (basis weight) of 5 to 100 g/m$^2$ and a tensile stress at 10% elongation of 0.5 N/15 mm or less. A preferred expanded porous polytetrafluoroethylene film is a biaxial expanded (biaxial stretched) porous polytetrafluoroethylene film. A breaking elongation of the expanded porous polytetrafluoroethylene film is, for example, from 50 to 700%. An average thickness of the expanded porous polytetrafluoroethylene film is, for example, from 7 to 300 μm. A maximum pore size of the expanded porous polytetrafluoroethylene film is, for example, from 0.01 to 10 μm. A porosity of the expanded porous polytetrafluoroethylene film is, for example, from 50 to 98%.

In this description, the term "film" is not limited in terms of its thickness and is used in the meaning of including a "sheet".

BEST MODE FOR CARRYING OUT THE INVENTION

Figure 1:
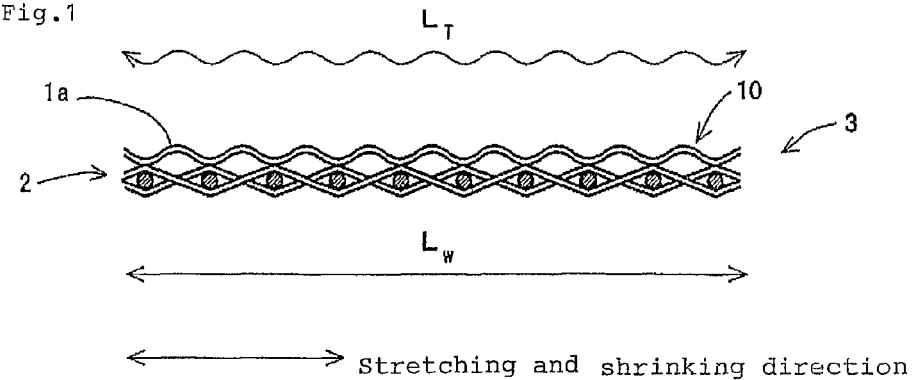
FIG. 1 is a schematic cross-sectional diagram of a conventional stretch composite fabric.

The stretch composite fabric of the present invention can be obtained by laminating a sintered expanded porous polytetrafluoroethylene film (sintered ePTFE film) to a stretch cloth while maintaining the stretch cloth in a shrunk state, and stretching and shrinking the resulting laminate under a predetermined condition. Because ePTFE has been sintered, the strength can be secured. Further, because lamination is effected while maintaining the stretch cloth in a shrunk state, ePTFE is not corrugated, and a flat state can be maintained. In addition, because the resulting laminate is stretched and shrunk under a predetermined condition, a stretch property (elongation property) of the composite fabric can be increased although sintered ePTFE is used. Hereinafter, a more detailed description will be provided.

It is important that as described above, the above-mentioned ePTFE film has been sintered. By sintering an ePTFE film, the strength (creep resistance strength) of the ePTFE film can be increased, and the occurrence of a delamination phenomenon of the ePTFE film can be prevented. When differential scanning calorimetry (DSC) of an unsintered ePTFE film is performed, heat absorption by ePTFE begins, for example, at a time when the temperature reaches around 250° C. By heating the ePTFE film to a temperature not lower than this heat absorption starting temperature, the ePTFE film can be sintered. If the ePTFE film is heated at a temperature sufficiently higher than the heat absorption starting temperature, the sintering efficiency can be increased. Accordingly, a preferred heating temperature is the melting point (for example, 327° C.) of sintered PTFE or higher.

Whether or not the ePTFE film has been sintered can be confirmed by, for example, measuring infrared absorption using an infrared spectrometer and confirming whether or not the amorphous absorption by sintered PTFE is observed at a wave number of 780 cm$^{-1}$ (for the details, see "Comparative quantitative Study on the crystallinity of poly(tetrafluoroethylene) including Raman, infra-red and 19F nuclear magnetic resonance spectroscopy", R. J. Lehnert, Polymer Vol. 38, No. 7, P. 1521-1535 (1997). For example, when infrared absorption by the sintered ePTFE film surface was measured by the ATR method (medium: KRS-5, incidence angle: 45°, resolution: 4 cm$^{-1}$, number of scanning cycles: 20 times) using an infrared spectrometer, "Paragon 1000" manufactured by Perkin Elmer, absorption was observed at 780 cm$^{-1}$.

Incidentally, whether or not the ePTFE film has been sintered can be confirmed also by DSC. For example, Shimizu made a speech in the memorial lecture for 50 year anniversary of discovery of PTFE in Toronto in July, 1988 that the melting temperature measured by DSC varies depending on the degree of sintering. Shimizu described that unsintered ePTFE has a melting peak at 345 to 347° C., completely sintered ePTFE has a melting peak at 327° C., and semisintered ePTFE has a melting peak at a temperature between these temperatures, and determination by DSC is also possible. The sintered ePTFE of the invention is preferably completely sintered ePTFE, however, semisintered ePTFE is also included.

The PTFE to be used in the sintered ePTFE film is preferably a homopolymer of tetrafluoroethylene, but is not limited to the homopolymer. The PTFE of the invention also includes modified PTFE obtained by copolymerization of tetrafluoroethylene with a relatively small amount (for example, about 1% by mass or less (preferably about 0.1 to 0.3% by mass) relative to tetrafluoroethylene) of a comonomer (such as hexafluoropropylene (HFP), perfluoropropylvinylether (PPVE), perfluoroethylvinylether (PEVE), chlorotrifluoroethylene (CTFE), or perfluoroalkylethylene), filler-containing PTFE in which a filler such as an inorganic substance or an organic substance has been mixed and the like.

The sintered ePTFE film may be a uniaxial expanded (uniaxial stretched) sintered ePTFE film, however, a biaxial expanded (biaxial stretched) sintered ePTFE film is preferred.

The physical properties of the sintered ePTFE film are not particularly limited, but are generally as follows. That is, a mass per unit area (basis weight) of the sintered ePTFE film is, for example, from about 5 to 100 g/m$^2$, preferably from about 5 to 70 g/m$^2$, more preferably from about 10 to 50 g/m$^2$. It is difficult to decrease the mass per unit area to a value smaller than the above range from the viewpoint of film formation techniques, and also the durability is decreased. On the other hand, when the mass per unit area exceeds the above range, the film becomes heavy, and moreover, the strength of the film is increased and therefore a stretching treatment will be difficult to perform.

An average thickness of the sintered ePTFE film is, for example, from about 7 to 300 µm, preferably from about 10 to 200 µm, more preferably from about 20 to 100 µm. When the film is formed to have a thickness smaller than the above range, the handleability of the film during film formation is decreased. On the other hand, when the film is formed to have a thickness larger than the above range, the flexibility of the film is deteriorated and also the moisture permeability is decreased. The average thickness of the film is an average of the values obtained by collecting 5 or more test pieces from the film and measuring the thickness of the respective test pieces under a condition in which no load other than the main body's spring load is applied using a 1/1000 mm dial thickness gage manufactured by Teclock Corporation.

A breaking elongation (tensile breaking elongation) of the sintered ePTFE film is, for example, from about 50 to 700%, preferably from about 80 to 600%, more preferably from about 100 to 500%. It is technically difficult to increase the breaking elongation to a value larger than the above range. On the other hand, when the breaking elongation is too small, sufficient stretching and shrinking treatments cannot be performed, and the stretch property (elongation property) of a composite fabric is decreased. The breaking elongation can be measured by fixing a test piece cut out to a width of 15 mm between the chucks with a chuck-to-chuck distance of 100 mm and performing a tensile test at a tensile speed of 200 mm/min.

A maximum pore size of the sintered ePTFE film is, for example, from about 0.01 to 10 µm, preferably from about 0.05 to 5 µm, more preferably from about 0.1 to 2 µm. It is technically difficult to decrease the maximum pore size to a value smaller than the above range. On the other hand, when the maximum pore size is increased to a value larger than the above range, the waterproof property of the film is decreased. Further, the strength of the film is decreased, resulting in difficulty in handling, and thus, the workability in the following steps (such as a laminating step) is decreased. The maximum pore size is obtained in accordance with the procedure described in ASTM F-316 (used agent: ethanol).

A porosity of the sintered ePTFE film is, for example, from 50 to 98%, preferably from 60 to 95%, more preferably from 70 to 90%. When the porosity becomes small, the flexibility is decreased, and also the film becomes heavy. On the other hand, when the porosity is increased, the strength of the film is decreased. The porosity can be calculated based on the following equation using an apparent density ($\rho$: unit is g/cm$^3$) measured in accordance with JIS K 885 and a density (true density) $\rho_{standard}$ (in the case of a homopolymer of tetrafluoroethylene, the true density is 2.2 g/cm$^3$) when no pore is formed.

$$\text{Porosity}(\%) = [1 - (\rho/\rho_{standard})] \times 100$$

Further, in the sintered ePTFE film of the invention, as necessary, an inner surface of holes (pores) of the sintered ePTFE film may be coated with a water-repellent polymer and/or an oil-repellent polymer while maintaining the continuity of pores. When the inner surface of pores is coated with a water-repellent/oil-repellent polymer, even if the sintered ePTFE film is exposed to various contaminants, the contaminants are difficult to penetrate into the inside of the sintered ePTFE film, and thus, a decrease in the hydrophobicity of the sintered ePTFE film can be prevented. Examples of the water-repellent/oil-repellent polymer include a polymer having a fluorine-containing side chain.

An example of the polymer having a fluorine-containing side chain and a method of coating the sintered ePTFE film with this polymer are described in, for example, the description of WO 94/22928, etc. An outline thereof is as follows. That is, in the description of WO 94/22928, as the polymer having a fluorine-containing side chain, polymers of a fluorinated alkyl (meth)acrylate represented by the following formula (I) are mentioned.

$$CF_3(CF_2)_n-CH_2CH_2-OC(=O)CR=CH_2 \quad (I)$$

(In the formula, n represents an integer of 3 to 13, and R is a hydrogen atom or a methyl group.)

The coating of the inside of pores of the sintered ePTFE film with a polymer represented by the formula (I) can be performed as follows. An aqueous microemulsion (an average particle size of about 0.01 to 0.5 µm) of a polymer represented by the formula (I) is prepared using a fluorine-containing surfactant (such as ammonium perfluorooctanoate), and the resulting emulsion is impregnated into the inside of pores of the sintered ePTFE film, and then, the sintered ePTFE film is heated. By heating the film, water and the fluorine-containing surfactant are removed. Further, the inner surface of pores of the sintered ePTFE film is coated with the melted polymer represented by the formula (I) while maintaining the continuity of pores.

Other examples of the polymer having a fluorine-containing side chain include "AF polymer" (trade name of DuPont Co., Ltd.) and "Cytop" (trade name of Asahi Glass Co., Ltd., which has a repeating unit represented by the following formula (II)). The coating of the inner surface of pores of the sintered ePTFE film with any of these other examples of polymers while maintaining the continuity of pores can be performed as follows. A liquid prepared by dissolving any of these other examples of polymers in an inactive solvent such as "Fluorinert" (trade name of Sumitomo 3M Limited) is impregnated into the sintered ePTFE film, and then, the solvent is removed by evaporation.

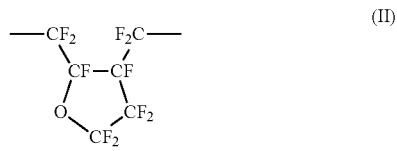

(II)

Conventionally, in order to allow a sintered ePTFE film to have a stretch property, an elastomer resin is applied to an ePTFE film such that a part of the elastomer resin penetrates into holes (pores) of the ePTFE film thereby forming an elastomer resin layer, however, the formation of an elastomer resin layer is not essential in the invention. The details will be described later. Conventionally, it is considered that if an elastomer resin layer is not formed, an elongation recovery of the sintered ePTFE film is lacking. However, the present inventor found that even if an elastomer resin layer is not formed, when a once stretched sintered ePTFE film is shrunk due to a stretch cloth laminated to this film or is allowed to naturally shrink, the sintered ePTFE film can be sufficiently restored to its original length, and moreover, the tensile stress of the sintered ePTFE film can be decreased by doing this, and the stretch property of a composite fabric can be increased.

However, also in the invention, if necessary, an elastomer resin layer may be formed on the sintered ePTFE film. Examples of the elastomer resin include synthetic rubbers such as silicone resin elastomers, fluororesin elastomers, polyester elastomers, polyurethane elastomers, NBR, epichlorohydrin and EPDM, and natural rubbers. In the case of a use requiring heat resistance, a silicone resin elastomer, a fluororesin elastomer and the like are preferred. Further, from the viewpoint of moisture permeability, a moisture permeable elastomer which is a polymeric material with a hydrophilic group such as a hydroxy group, a carboxyl group, a sulfonic acid group, an amino acid group or an oxyethylene group, and is water swellable and water insoluble is preferably used. Specific examples of the moisture permeable elastomer include hydrophilic polymers such as polyvinyl alcohol, cellulose acetate and cellulose nitrate, and hydrophilic polyurethane resins. At least a portion of these moisture elastomers has been crosslinked. Preferred examples of the moisture permeable elastomer include hydrophilic polyurethane resins from the viewpoint of being excellent in chemical resistance, processability, moisture permeability and the like. As the elastomer resin, two or more types thereof may be appropriately mixed and used. Further, in order to improve the durability or impart an antistatic property, a filler such as an inorganic substance or an organic substance may be mixed therein.

The elastomer resin layer may be formed on one surface of the sintered ePTFE film or may be formed on both surfaces thereof. In the case where the elastomer resin layer is formed, the elastomer resin layer may be laminated to a surface of the sintered ePTFE film, however, it is recommended that the whole or a part (preferably a part) of the elastomer resin layer is allowed to penetrate into the inside (pores) of the sintered ePTFE film. By the penetration thereof into the pores, detachment of the elastomer resin layer can be prevented.

A thickness of the elastomer resin layer is, for example, about 500 μm or less, preferably about 300 μm or less, more preferably about 100 μm or less. When the elastomer resin layer becomes too thick, the sintered ePTFE film on which this elastomer resin layer has been formed becomes hard and heavy, and further the moisture permeability is decreased. The thickness of the elastomer resin layer refers to the sum of the thickness of a portion where the elastomer resin is densely filled in the pores of the sintered ePTFE film and the thickness of a portion where the elastomer resin is laminated to the surface of the sintered ePTFE film.

In the case where a moisture permeable elastomer is used as the elastomer resin, a thickness of a portion where the moisture permeable elastomer is densely filled in the pores of the sintered ePTFE film is preferably from about 3 to 30 μm, most preferably from about 5 to 20 μm from the viewpoint of moisture permeability, flexibility (texture) and durability.

The thickness of the entire elastomer resin layer or the thickness of the moisture permeable elastomer which penetrates into the inside of pores of the ePTFE film can be measured by taking a cross-sectional scanning electron micrograph (1000 to 3000 magnification) and using a scale (a scale bar indicating the length) of the electron micrograph.

The formation of the elastomer resin layer on the surface of the sintered ePTFE film can be achieved by applying a liquid material containing an elastomer resin (or a precursor thereof) to the sintered ePTFE film. For example, in the case where the elastomer resin is a hydrophilic polyurethane resin, an application liquid is prepared by liquefying (particularly dissolving) a heat-curable or moisture-curable polyurethane raw material (such as a prepolymer or a gum base), a thermoplastic or incomplete thermoplastic polyurethane or the like in a solvent or by heating and the resulting application liquid may be applied to the sintered ePTFE film with a roll coater or the like. A viscosity of the application liquid suitable for impregnating the hydrophilic polyurethane resin into the surface layer portion of the sintered ePTFE film is 20,000 cps (mPa·s) or less, more preferably 10,000 cps (mPa·s) or less at an application temperature. In the case where the liquefaction (dissolution) is achieved using a solvent, when the viscosity is decreased too much, the application liquid (solution) is spread on the entire sintered ePTFE film after application depending on the type of the used solvent and the entire sintered ePTFE film is made hydrophilic in some cases. As a result, a dense resin layer is not formed on the surface of the sintered ePTFE film and the waterproof property is deteriorated in some cases. Therefore, a viscosity of the application liquid is preferably set to 500 cps (mPa·s) or more. The viscosity can be measured using a B-type viscometer manufactured by Toki Sangyo Co., Ltd.

The sintered ePTFE film (or the sintered ePTFE film on which the elastomer resin layer is formed. Hereinafter, the term "sintered ePTFE film" is used in the meaning including the sintered ePTFE film on which the elastomer resin layer is formed) is laminated to a stretch cloth. The sintered ePTFE film can be protected by this stretch cloth. In a fiber which forms the stretch cloth, synthetic fibers, natural fibers and the like are included. As the synthetic fibers, polyamide fibers, polyester fibers, polyurethane fibers, polyolefin fibers, polyvinyl chloride fibers, polyvinylidene chloride fibers, polyfluorocarbon fibers and polyacrylic fibers can be exemplified. Further, in the synthetic fibers, stretch fibers (stretch polyurethane fibers such as spandex, stretch polyester fibers such as special polyester (PBT) fibers and the like) are included. Further, as the natural fibers, for example, cotton, hemp, animal hair, silk and the like can be exemplified.

Further, as a structure of the cloth, various structures of such as a woven cloth, a knitted cloth (knit), a nonwoven cloth, a net, and a cloth whose stretch property (mechanical stretch) has been improved by applying special "twisting" to a fiber can be exemplified. The stretch cloth may be one sheet of cloth, or a cloth obtained by superimposing a plurality of cloths.

The type of the fiber or the structure of the cloth can be determined within a range in which a suitable stretch property can be imparted to the stretch cloth. Therefore, it is not necessary to use the stretch fiber for the entire cloth as long as the cloth has an adequate stretch property, and the stretch fiber may be used partially. Further, depending on the structure of the cloth, the stretch fiber may not be used at all.

An elongation (E) of the stretch cloth is, for example, 30% or more, preferably 50% or more, more preferably 100% or more. As the elongation of the cloth is increased, the stretch property of the resulting composite fabric is increased. An upper limit of the elongation is not particularly limited, but is generally about 300% or less (for example, about 200% or less).

The elongation E of the stretch cloth can be measured in accordance with the JIS L 1096 B method. That is, a test piece is cut out to a width of 5 cm and a length of 20 cm or more and is stretched in a length direction under a load of 300 g. The length of the stretch cloth (test piece) is measured before the load is applied and when the load is applied for 1 minute, and the elongation E is determined based on the following equation.

$$E = (T2/T1 - 1) \times 100$$

(In the equation, E represents an elongation, T1 represents the length of the test piece before the load is applied, and T2 represents the length of the test piece when the load is applied. More specifically, two standard lines are drawn at a distance of 20 cm on the test piece before the test is performed (T1=20 cm). Then, the distance between the standard lines when the load is applied is measured, and the measurement value is assigned to T2.)

Further, a recovery (R) of the stretch cloth is, for example, from 80 to 100%, preferably from 85 to 100%, more preferably from 90 to 100%. When the recovery (R) is too small, the stretch property is decreased. The recovery R of the stretch cloth can be measured in accordance with the JIS L 1096 B-1 method. That is, a test piece is cut out to a width of 5 cm and is stretched in a length direction under a load of 300 g for 1 minute and then released from the stress. Also, the length of the stretch cloth (test piece) is measured before the load is applied, when the load is applied for 1 minute, and 1 minute after the load is removed, and the recovery can be determined based on the following equation.

$$R = (L2 - L3)/(L2 - L1) \times 100$$

(In the equation, R represents a recovery, L1 represents the length of the test piece before the load is applied, L2 represents the length of the test piece when the load is applied, and L3 represents the length of the test piece after the load is removed. More specifically, two standard lines are drawn at a distance of 20 cm on the test piece before the test is performed (L1=20 cm). Then, the distance between the standard lines when the load is applied is assigned to L2, and the distance between the standard lines after the load is removed is assigned to L3.)

The laminated structure of the sintered ePTFE film and the stretch cloth is not particularly limited, and any of various structures such as a two-layered structure in which the stretch cloth is laminated to one surface of the sintered ePTFE film and a three-layered structure in which the stretch cloth is laminated to both surfaces of the sintered ePTFE film can be adopted.

Further, it is preferred that an outer exposed surface of the stretch cloth is subjected to a water-repellent treatment with a water repellent such as a fluorine water repellent or a silicone water repellent. In the case where the stretch composite fabric is used in rain gear products (such as clothes, head wears, gloves and foot wears), when the cloth exposed to the outer surface absorbs water, a water membrane is formed on this surface, therefore the moisture permeability of the stretch composite fabric is inhibited and also the weight of the sheet is increased, resulting in decreasing comfort. By the water-repellent treatment, such a decrease in comfort can be prevented.

Also, the method of laminating the sintered ePTFE film to the stretch cloth is not particularly limited, and the sintered ePTFE film and the stretch cloth may be bonded to each other by adopting any of various known methods (such as adhesion and heat-fusion). For example, a method in which an adhesive is applied to the sintered ePTFE film with a gravure-patterned roll, and then the stretch cloth is superimposed thereon and pressure bonded thereto with a roll; a method in which an adhesive is sprayed on the sintered ePTFE film, and then the stretch cloth is superimposed thereon and pressure bonded thereto with a roll; a method in which the sintered ePTFE film and the stretch cloth are superimposed and heat-fused to each other with a heat roll or the like can be suitably adopted.

A preferred bonding method is adhesion. As the adhesive, any can be used as long as a decrease in the adhesion strength is not easily caused under a normal condition for use. In general, a water-insoluble adhesive is used. The water-insoluble adhesive may be a conventionally known water-insoluble adhesive, and for example, a thermoplastic resin adhesive, a curable resin adhesive (such as a heat-curable adhesive, a moisture-curable adhesive or a photo-curable adhesive) and the like can be exemplified.

A ratio of the area of the bonded part (adhered part, heat-fused part) between the sintered ePTFE film and the stretch cloth to the overlapped area (100%) between the sintered ePTFE film and the stretch cloth is from about 3 to 90%, preferably from about 5 to 80%. When the area of the bonded part is too small, the bonding strength is lacking. On the other hand, when the area of the bonded part is too large, the texture of the resulting stretch composite fabric becomes hard, and also the moisture permeability becomes insufficient.

Figure 2:
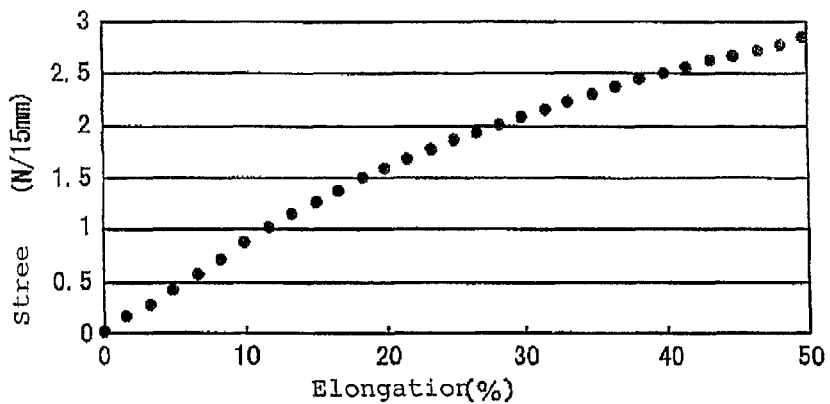
FIG. 2 is a stress-elongation curve of a sintered ePTFE film before stretching and shrinking treatments.
Figure 3:
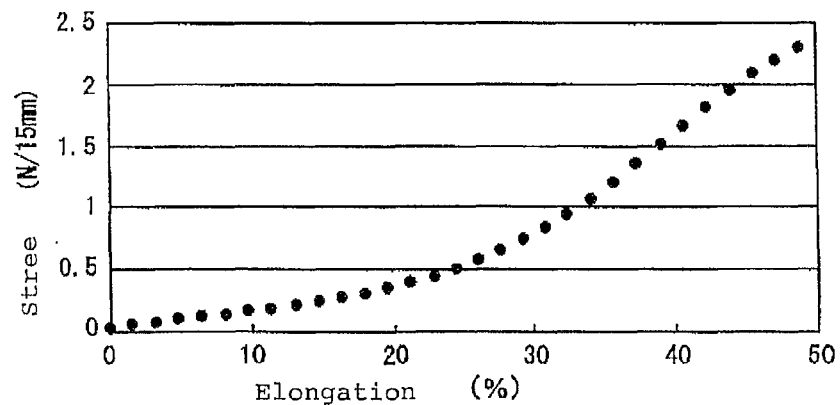
FIG. 3 is a stress-elongation curve of a sintered ePTFE film after stretching and shrinking treatments.

The stretch property of the laminate (stretch composite fabric) can be increased by stretching the laminate of the sintered ePTFE film and the stretch cloth obtained as described above in a planar direction and then shrinking the laminate. FIG. 2 and FIG. 3 are graphs showing a relationship between stretching and shrinking treatments and the stretch property of a sintered ePTFE film. FIG. 2 shows a stress-elongation curve of a sintered ePTFE film before stretching and shrinking treatments, and FIG. 3 shows a stress-elongation curve of a sintered ePTFE film after stretching and shrinking treatments. The sintered ePTFE film of FIG. 3 is a sintered ePTFE film obtained by being stretched to 1.6 times in one direction at a temperature of 150° C. while preventing the occurrence of necking and then heat-shrinking the sintered ePTFE film to a length which is almost the same as before stretching by leaving the sintered ePTFE film at a temperature of 100° C. for 90 seconds. The reason why a stretch cloth is not laminated in the example of FIG. 3 is to accurately understand a change in the physical properties of a portion of the sintered ePTFE film. As is apparent from the examples of FIGS. 2 and 3, when the elongation is large, the stress is hardly decreased (accordingly, the strength itself of the sintered ePTFE film is hardly decreased), and further, the length of the sintered ePTFE film is almost the same before and after the stretching and shrinking treatments, however, when the elongation is small, the tensile stress is markedly decreased, surprisingly to about ¼ to ⅕. Due to this, it becomes possible to achieve an extremely excellent stretch property.

It is important that the area of the laminate is extended by stretching the laminate in a planar direction in the stretching and shrinking treatments. In the case where the laminate has been stretched so as to extend the area thereof, when the stretching force is removed and the laminate is left as such, the sintered ePTFE film is restored to its original size, and the stretch property thereafter is extremely increased. Even if the laminate is stretched in one direction, when necking or the like occurs, the area itself of the laminate is not extended. In this case, even when the stretching force is removed, the sintered ePTFE film is difficult to be restored to its original form, and even if the sintered ePTFE film is forcibly restored to its original form by a mechanical external force, the stretch property is not increased. The reason is unknown, but is presumed as follows. In the case where the area is not extended, the net-like shape (pore shape) of the sintered ePTFE film is only deformed and fibrils are not drawn out from nodes. On the other hand, when the sintered ePTFE film is stretched so as to extend the area, fibrils are drawn out from nodes, and these once drawn out fibrils are restored by a shrinking treatment. When a stress acts on again, the restored fibrils are more easily drawn out from the nodes than the previous time.

That is, ePTFE is composed of a granular portion (node, an aggregate of PTFE primary particles) and a fibrous portion (fibril) drawn out from this node. According to "Fusso Jushi Hando Bukku (Fluororesin Handbook)" edited by the Nikkan Kogyo Shimbun Ltd., a PTFE primary particle (node) has a lamellar structure in which a strip of PTFE molecules is folded, and a fibril is considered to be a PTFE molecule drawn out from this PTFE primary particle (node). When a film composed of this ePTFE is subjected to a stretching treatment while fixing the dimension in the direction orthogonal to the stretching direction (preventing the occurrence of necking), the area of the film is increased. In order to extend the area of the film, either of the following two phenomena is required to occur. The fibril is drawn out from the node portion or the fibril itself elongates. The present inventor experimentally knows that an ePTFE film with few nodes is difficult to be stretched, and presumes that the fibril is drawn out from the node instead of elongation of the fibril itself. Further, in the sintered ePTFE film subjected to a shrinking treatment after stretching, the EBP (EBP is described in ASTM F-316-86. EBP is a value which is for estimating the pore size and is theoretically proportional to the circumferential length of pore. As EBP is larger, the pore size is smaller.) value is larger than a value predicted from a stretching ratio (a change in the length of pore size) This fact also supports that the fibrils are drawn out from the nodes during stretching (however, a part of the fibrils are restored by the following shrinking treatment).

An area extension ratio (the area during the stretching treatment relative to the original area) by the stretching treatment is, for example, 1.4 times or more, preferably 1.5 times or more, more preferably 1.6 times or more. An upper limit of the extension ratio can be appropriately set within a range in which the sintered ePTFE film is not torn, and for example, is 3 times or less, preferably 2.5 times or less, more preferably about 2.0 times or less.

In order to extend the area by the stretching treatment, it is convenient to stretch the laminate of the sintered ePTFE film and the stretch cloth in a uniaxial direction while preventing the occurrence of necking in the same manner as the above-mentioned case of FIG. 3. In addition, the laminate may be stretched in biaxial directions.

It is recommended that a temperature for the stretching treatment is set to, for example, 220° C. or lower, preferably 200° C. or lower, more preferably 170° C. or lower (particularly 150° C. or lower). When the temperature for the stretching treatment is too high, the stretch cloth is easily heat-set, and the stretch property of the laminate (stretch composite fabric) is liable to decrease. On the other hand, a lower limit of the stretching temperature is not particularly limited as long as the sintered ePTFE film is not torn, and may be, for example, around room temperature, however, a lower limit of the stretching temperature is preferably around 50° C., more preferably around 80° C. As the stretching temperature is higher, stretching can be more easily performed.

The shrinking treatment can be performed by removing the stretching force which is allowed to act on the laminate in the stretching treatment. By utilizing the shrinking force of the stretch cloth to be used in the laminate, the laminate can be shrunk. The shrinking treatment does not essentially require a mechanical external force. As is apparent from the case of FIG. 3, the sintered ePTFE film is shrunk by heating (further, as described later, only by leaving as such without heating), and the stretch property thereof can be increased.

A temperature for the shrinking treatment may be the same as that for the stretching treatment, however, in the case where the temperature for the stretching treatment is high (for example, higher than 100° C.), the temperature for the shrinking treatment may be decreased from the temperature for the stretching treatment, for example, to 100° C. or lower (preferably 80° C. or lower). When the temperature for the shrinking treatment is decreased in the case where the temperature for the stretching treatment is high, the heat-setting of the stretch cloth can be reduced, and the stretch property can be further increased. Further, it is recommended that the temperature for the shrinking treatment is set to, for example, 50° C. or higher, preferably 70° C. or higher. By performing shrinking at a temperature within this range, more fibrils are restored or the like, therefore irregularities (wrinkles) of the film can be reduced.

The temperature for the stretching treatment and the temperature for the shrinking temperature are values obtained by measuring an atmospheric temperature in an area (such as an oven) through which the laminate is passed by a thermocouple.

The stretch composite fabric obtained as described above has an extremely favorable stretch property. A stretch property can be evaluated by a tensile stress at 10% elongation. The tensile stress at 10% elongation of the stretch composite fabric of the invention is, for example 1.8 N/15 mm or less, preferably 1.2 N/15 mm or less, more preferably about 1.0 N/15 mm or less. A lower limit thereof is not particularly limited, but may be, for example, about 0.5 N/15 mm. Such a low tensile stress may be achieved in at least one direction (the direction at which the stretching and shrinking treatments have been performed), however, in the case where the stretching and shrinking treatments are performed in two or more directions (particularly two directions), it is preferred that the above-mentioned low tensile stress can be achieved in these two or more directions. When the tensile stress is low in two or more directions, the stretch property is further improved in bodily sensation.

The tensile stress can be measured by fixing a test piece cut out to a width of 15 mm between the chucks with a chuck-to-chuck distance of 100 mm and performing a tensile test at a tensile speed of 200 ram/min.

Figure 4:
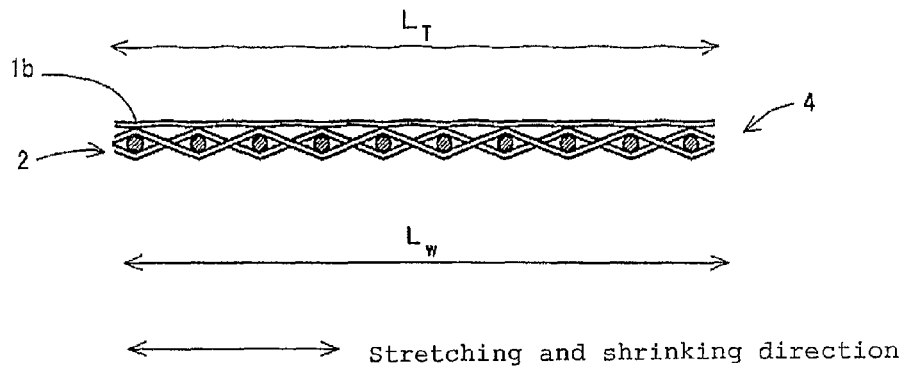
FIG. 4 is a schematic cross-sectional diagram showing an example of the stretch composite fabric of the invention.

Further, the stretch composite fabric of the invention is characterized also in that the stretch property is exhibited by laminating the sintered ePTFE film in a flat state as such without adopting a pleated structure. FIG. 4 is a schematic cross-sectional diagram of the stretch composite fabric 4 of the invention. As shown in this drawing, the sintered ePTFE film 1b is laminated to the stretch cloth 2 in a flat state. Compared with the conventional stretch composite fabric 3 shown in FIG. 1, the flatness of the sintered ePTFE film of the invention is extremely high. By increasing the flatness of the sintered ePTFE film, the aesthetic appearance of the laminate (stretch composite fabric 4) is not deteriorated and further, the damage of the laminate can be prevented.

The flatness of the sintered ePTFE film can be converted into a numerical value using a ratio ($L_T/L_W$) of a true length ($L_T$ in FIGS. 1 and 4) of the film to an apparent length ($L_W$ in FIGS. 1 and 4, a length when the film is projected onto a flat surface parallel to the film surface, the length of a width) of the film. A flatness ($L_T/L_W$) of the stretch composite fabric of the invention is, for example, about 1.2 or less, preferably about 1.1 or less. The flatness can be determined based on a cross-sectional scanning electron micrograph (SEM photograph).

An elongation (E) of the stretch composite fabric of the invention is, for example, 20% or more, preferably 25% or more, more preferably 30% or more. It is preferred that the elongation E is higher. An upper limit thereof is not particularly limited, but is generally about 70% or less. Further, a recovery (R) of the stretch composite fabric is, for example, from about 70 to 100%, preferably from about 80 to 100%, more preferably from about 90 to 100%. The elongation E and the recovery R of the stretch composite fabric can be determined by performing the same test as that for the elongation E and the recovery R of the stretch cloth. Further, these elongation and recovery may be achieved in at least one direction (the direction at which the stretching and shrinking treatments have been performed), however, it is preferred that these elongation and recovery are achieved in two or more directions (particularly two directions).

In the invention, in addition to the above-mentioned stretch composite fabric, fiber products utilizing this fabric and sintered ePTFE films after stretching and shrinking treatments are also included. Examples of the fiber products include apparel products such as clothes, head wears, gloves and foot wears, bedclothes products such as comforters, bed sheets and sleeping bags, film constructions such as tents, and pouch-like products such as bags.

The above-mentioned sintered ePTFE film after the stretching and shrinking treatments may be produced by removing the stretch cloth from the stretch composite fabric, but may be produced by subjecting only a sintered ePTFE film to the stretching and shrinking treatments. In the case where only a sintered ePTFE film is stretched, the film is easily torn during stretching. Therefore, it is recommended that the lower limit of the stretching temperature is set higher than that in the case of the laminate (stretch composite fabric). For example, it is preferred that a lower limit of the stretching temperature is set to 50° C. or higher, preferably 80° C. or higher. On the other hand, it is not necessary to prevent heat-setting of the stretch cloth, therefore, the upper limit of the stretching temperature may be set higher than that in the case of the laminate. However, when the stretching temperature exceeds 300° C., even the sintered ePTFE film is easily heat-set, and the stretch property of the sintered ePTFE film is liable to decrease. Accordingly, an upper limit of the stretching temperature is, for example about 300° C., preferably about 280° C., more preferably about 250° C., particularly about 200° C.

The shrinking treatment can be performed by removing the stretching force which is allowed to act on the laminate in the stretching treatment in the same manner as in the case of the laminate (stretch composite fabric). When the stretched sintered ePTFE film is left as such at normal temperature or under heating, the stretched sintered ePTFE film is naturally shrunk, and the stretch property of the sintered ePTFE film after shrinking is increased. From the viewpoint of reducing irregularities (wrinkles) of the sintered ePTFE film after shrinking, shrinking is preferably performed under heating.

A tensile stress at 10% elongation of the sintered ePTFE film after the stretching and shrinking treatments is, for example, about 0.5 N/15 mm or less, preferably about 0.4 N/15 mm or less, particularly about 0.3 to 0.1 N/15 mm. Further, the mass per unit area, thickness, maximum pore size, porosity and the like of the sintered ePTFE film after the stretching and shrinking treatments are almost the same as those before the treatments.

According to the invention, because the sintered ePTFE film is subjected to a stretching treatment such that the area of the sintered ePTFE film is sufficiently extended, the stretch property of the ePTFE film or the stretch property of a stretch composite fabric comprising the ePTFE film and a stretch cloth laminated to each other can be increased without decreasing the strength of ePTFE and corrugating the ePTFE film.

EXAMPLES

Hereinafter, the present invention will be described more specifically with reference to Examples. However, the invention is not limited to the following Examples, and can naturally be implemented by appropriately modifying the invention to the extent consistent with the gist of the invention as described above and below, and all such modifications are within the technical scope of the invention.

Example 1

To a device equipped with a tenter for extending the width in a heater oven (hereinafter referred to as Device A), a sintered ePTFE film (thickness: 50 μm, maximum pore size: 0.3 μm, porosity: 800, mass per unit area: 22 g/m², breaking elongation in a width direction in a tensile test: 260%) manufactured by Japan Gore-Tex Inc. was continuously fed, and the film was stretched in a width direction by the tenter. The film was shrunk by reducing the width of the tenter to 1.05 times the original width thereof in the oven, and the film was removed from the tenter and continuously taken up (the detailed stretching and shrinking conditions are as described in the following Tables 1 and 2). At this time, in order to prevent the occurrence of film necking in a length direction, the film was allowed to travel at an appropriate rate.

The tensile stress at 10% elongation of the sintered ePTFE film before and after the stretching and shrinking treatments is shown in the following Table 1.

Reference Example 1

The same procedure as in Example 1 was performed except that the stretching temperature was changed to room temperature (around 25° C.). The film was torn during stretching, and the stretching treatment could not at all be performed.

Example 2

To one surface of the sintered ePTFE film used in Example 1, a moisture-curable adhesive was transferred in a dotted pattern using a gravure roll (transfer area: 40%), and a knit (mixing ratio of nylon/spandex (mass ratio)=75/25, gauge: 28 G, mass per unit area: 58 g/m$^2$, elongation in a width direction: 150%, recovery in a width direction: 95%, hereinafter referred to as Knit A) was laminated to this transferred surface, and the resulting laminate was left as such at room temperature until the adhesive was cured by the moisture in the air. The resulting laminate having a two-layered structure was continuously fed to Device A, and stretched in a width direction by the tenter. Then, the laminate was shrunk by reducing the width of the tenter in the oven, and the laminate was removed from the tenter and continuously taken up, whereby a stretch composite fabric was obtained (the detailed stretching and shrinking conditions are as described in the following Table 1).

Figure 5:
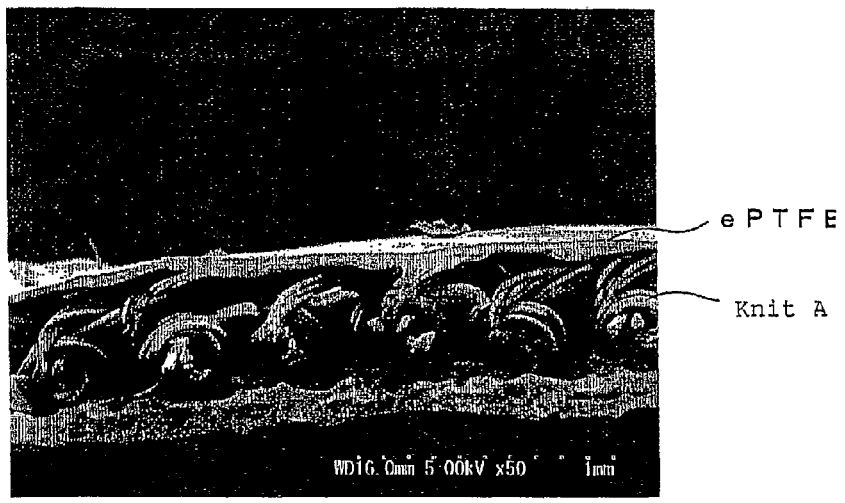
FIG. 5 is a cross-sectional SEM photograph of a composite fabric of Example 2 before stretching and shrinking treatments.
Figure 6:
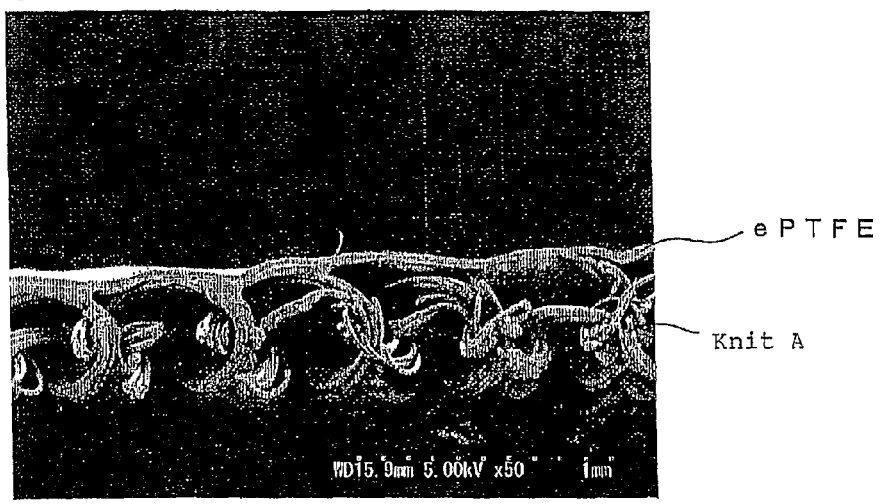
FIG. 6 is a cross-sectional SEM photograph of a composite fabric of Example 2 after stretching and shrinking treatments.

The physical properties (elongation, recovery, tensile stress at 10% elongation and flatness) of the composite fabric before and after the stretching and shrinking treatments are shown in the following Table 1. Further, the abrasion resistance of this composite fabric was tested in accordance with the JIS L1096 E method (Martindale method, abrasive cloth: standard abrasive cloth, pressing load: 12 kPa), and the number of abrasion cycles until a hole was formed was counted. This result is also shown in the following Table 1. Further, cross-sectional SEM photographs of the composite fabric in a width direction are shown in FIGS. 5 and 6. FIG. 5 is a photograph of the composite fabric taken before the stretching and shrinking treatments, and FIG. 6 is a photograph of the composite fabric taken after the stretching and shrinking treatments.

Example 3

The same procedure as in Example 2 was performed except that the stretching temperature and the shrinking temperature were changed to 55° C.

The physical properties of the composite fabric before and after the stretching and shrinking treatments are shown in the following Table 1.

Example 4

The same procedure as in Example 2 was performed except that Knit A was laminated to both surfaces of the sintered ePTFE film.

The physical properties of the composite fabric before and after the stretching and shrinking treatments are shown in the following Table 1.

Example 5

The same procedure as in Example 4 was performed except that a textile comprising 40 d nylon as a warp and a combination of 70 d nylon and 70 d spandex (mixing ratio of nylon/spandex 92/8 (mass ratio)) as a weft (elongation in a width direction (weft direction): 55%, recovery in a width direction (weft direction): 95%, hereinafter referred to as Textile A) was laminated to a front surface of the sintered ePTFE film, and a circular knit consisting of 70 d polyester (gauge: 28 G, mass per unit area: 59 g/m$^2$, elongation in a width direction: 200%, recovery in a width direction: 55%, hereinafter referred to as Knit B) was laminated to a rear surface of the sintered ePTFE film instead that Knit A was laminated to both surfaces of the sintered ePTFE film.

The physical properties of the composite fabric before and after the stretching and shrinking treatments are shown in the following Table 1.

Example 6

The same procedure as in Example 2 was performed except that the shrinking temperature was changed to 70° C.

The physical properties of the composite fabric before and after the stretching and shrinking treatments are shown in the following Table 1.

Example 7

The same procedure as in Example 2 was performed except that the stretching temperature and the shrinking temperature were changed to 170° C.

The physical properties of the composite fabric before and after the stretching and shrinking treatments are shown in the following Table 2.

Example 8

A laminate (composite fabric) of a sintered ePTFE film and Knit A obtained in the same manner as in Example 2 was subjected to a stretching treatment using a batch-type biaxial stretching machine. In the stretching treatment, the laminate was stretched in a longitudinal direction and a width direction simultaneously. After the stretching treatment, the laminate (composite fabric) was left as such in a free state and allowed to shrink to its original size (the detailed stretching and shrinking conditions are as described in the following Table 2).

The physical properties of the composite fabric before and after the stretching and shrinking treatments are shown in the following Table 2.

Example 9

The same procedure as in Example 2 was performed except that the stretching temperature and the shrinking temperature were changed to 220° C.

The physical properties of the composite fabric before and after the stretching and shrinking treatments are shown in the following Table 2.

Comparative Example 1

A laminate (composite fabric) of a sintered ePTFE film and Knit A obtained in the same manner as in Example 2 was stretched to 2.00 times in a width direction at room temperature. During the stretching treatment, the central part was necked to about half of its original width. When the stretching stress was removed, the composite fabric was restored to 72% of its original length.

The physical properties of the composite fabric after the composite fabric was left horizontally for 1 hour are shown in the following Table 2.

Reference Example 2

The same procedure as in Example 2 was performed except that instead of Knit A, a cloth with a 2/2 twill structure (twill fabric) (40 d/34 f textured yarn was used for both warp and weft. density: 165×77 yarns/inch, elongation in a width direction: 23%, recovery in a width direction: 75%, hereinafter referred to as Textile B) was laminated to one surface of the sintered ePTFE film and the stretching ratio was changed to 1.35 times.

The physical properties of the composite fabric before and after the stretching and shrinking treatments are shown in the following Table 2.

Comparative Example 2

A sintered ePTFE film and Knit A were laminated to each other in the same manner as in Example 2 except that Knit A was stretched to about twice in a longitudinal direction during lamination, and curing and lamination were performed by passing the laminate through a heater roll at a temperature of 150° C. Further, the resulting laminate was fed to an oven (temperature: 100° C.) again at an overfeed of about 80%, whereby Knit A was shrunk in a longitudinal direction, and a composite fabric having a corrugated sintered ePTFE film in a pleated form was obtained.

Figure 7:
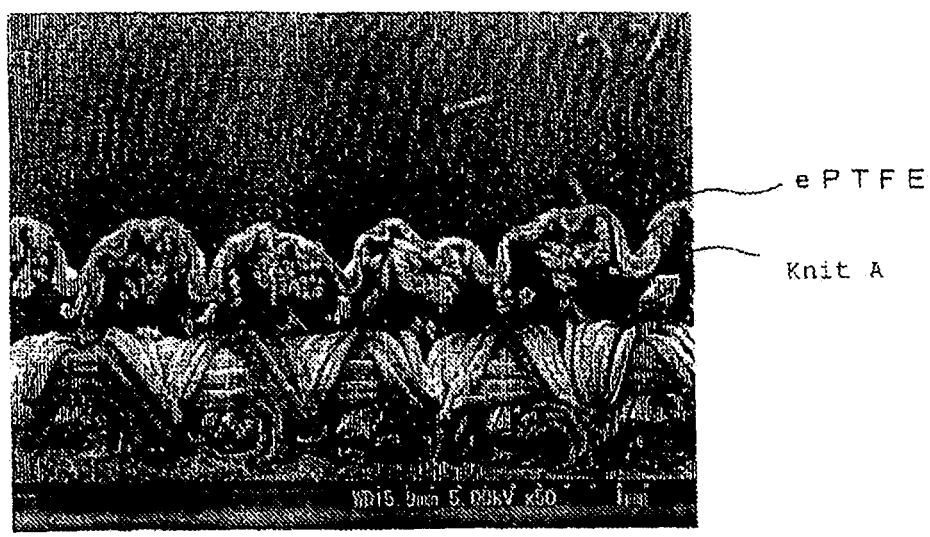
FIG. 7 is a cross-sectional SEM photograph of a composite fabric of Comparative example 2.

The physical properties of this composite fabric are shown in the following Table 2. Further, the abrasion resistance of this composite fabric was tested in the same manner as in Example 2 and the results are also shown in the following Table 2. Further, a cross-sectional SEM photograph of the composite fabric in a longitudinal direction is shown in FIG. 7.

TABLE 1

|  |  | Example 1 | Reference Example 1 | Example 2 | Example 3 | Example 4 | Example 5 | Example 6 |
|---|---|---|---|---|---|---|---|---|
| Before stretching and shrinking treatments | Elongation | — | — | Width direction: 18% | Width direction: 18% | Width direction: 15% | Width direction: 13% | Width direction: 18% |
|  | Recovery | — | — | Width direction: 75% | Width direction: 75% | Width direction: 85% | Width direction: 82% | Width direction: 75% |
|  | Tensile stress at 10% elongation (N/15 mm) | Width direction: 0.8 | Width direction: 0.8 | Width direction: 2.1 | Width direction: 2.1 | Width direction: 2.2 | Width direction: 2.5 | Width direction: 2.1 |
| Condition for stretching treatment | Condition for stretching in width direction | Temperature: 150° C. 1.50 times | Temperature: room temperature 1.50 times (torn) | Temperature: 110° C. 1.80 times | Temperature: 55° C. 1.80 times | Temperature: 110° C. 1.80 times | Temperature: 110° C. 1.80 times | Temperature: 110° C. 1.80 times |
|  | Condition for stretching in longitudinal direction | — | — | — | — | — | — | — |
|  | Area extension ratio | 1.50 times | 1.50 times | 1.80 times | 1.80 times | 1.80 times | 1.60 times | 1.80 times |
| Condition for shrinking treatment |  | Temperature: 150° C. | — | Temperature: 110° C. | Temperature: 55° C. | Temperature: 110° C. | Temperature: 110° C. | Temperature: 70° C. |
| After stretching and shrinking treatments | Elongation | — | — | Width direction: 40% | Width direction: 42% | Width direction: 35% | Width direction: 30% | Width direction: 43% |
|  | Recovery | — | — | Width direction: 92% | Width direction: 93% | Width direction: 95% | Width direction: 91% | Width direction: 94% |
|  | Tensile stress at 10% elongation (N/15 mm) | Width direction: 0.2 | — | Width direction: 0.8 | Width direction: 0.8 | Width direction: 1.1 | Width direction: 1.0 | Width direction: 0.8 |
| Flatness |  | — | — | 1.10 | 1.07 | 1.11 | 1.08 | 1.09 |
| Abrasion resistance |  | — | — | 2000 times or more | — | — | — | — |

TABLE 2

|  |  | Example 7 | Example 8 | Example 9 |
|---|---|---|---|---|
| Before stretching and shrinking treatments | Elongation | Width direction: 18% | Width direction: 18% Longitudinal direction: 5% | Width direction: 18% |
|  | Recovery | Width direction: 75% | Width direction: 75% Longitudinal direction: 80% | Width direction: 75% |
|  | Tensile stress at 10% elongation (N/15 mm) | Width direction: 2.1 | Width direction: 2.1 Longitudinal direction: 2.1 | Width direction: 2.1 |
| Condition for stretching treatment | Condition for stretching in width direction | Temperature: 170° C. 1.80 times | Temperature: 150° C. 1.50 times | Temperature: 220° C. 1.80 times |
|  | Condition for stretching in longitudinal direction | — | Temperature: 150° C. 1.20 times | — |

TABLE 2-continued

|  |  |  |  |  |
|---|---|---|---|---|
|  | Area extension ratio | 1.80 times | 1.80 times | 1.80 times |
| Condition for shrinking treatment |  | Temperature: 170° C. | Temperature: 150° C. | Temperature: 220° C. |
| After stretching and shrinking treatments | Elongation | Width direction: 37% | Width direction: 28%<br>Longitudinal direction: 10% | Width direction: 15% |
|  | Recovery | Width direction: 91% | Width direction: 93%<br>Longitudinal direction: 95% | Width direction: 77% |
|  | Tensile stress at 10% elongation (N/15 mm) | Width direction: 1.2 | Width direction: 1.2<br>Longitudinal direction: 1.7 | Width direction: 1.8 |
| Flatness |  | 1.05 | 1.10 | 1.03 |
| Abrasion resistance |  | — | — | — |

|  |  | Comparative Example 1 | Reference Example 2 | Comparative Example 2 |
|---|---|---|---|---|
| Before stretching and shrinking treatments | Elongation | Width direction: 18% | Width direction: 3% | Longitudinal direction: 60% |
|  | Recovery | Width direction: 75% | Width direction: 83% | Longitudinal direction: 96% |
|  | Tensile stress at 10% elongation (N/15 mm) | Width direction: 2.1 | Width direction: 2.4 | Width direction: 0.6 |
| Condition for stretching treatment | Condition for stretching in width direction | Temperature: room temperature 2.00 times (the central part was necked to half) | Temperature: 110° C. 1.35 times | — |
|  | Condition for stretching in longitudinal direction | — | — | — |
|  | Area extension ratio | about 1 time | 1.35 times | — |
| Condition for shrinking treatment |  | Temperature: room temperature | Temperature: 110° C. | — |
| After stretching and shrinking treatments | Elongation | Width direction: 23% | Width direction: 9% | — |
|  | Recovery | Width direction: 78% | Width direction: 85% | — |
|  | Tensile stress at 10% elongation (N/15 mm) | Width direction: 1.9 | Width direction: 1.9 | — |
| Flatness |  | 1.30 | 1.05 | 1.70 |
| Abrasion resistance |  | — | — | 1000 times |

When a pleated structure is adopted, a composite fabric which is excellent in all the elongation, recovery and tensile stress at 10% elongation and has a high stretch property can be obtained (Comparative Example 2). However, this composite fabric of Comparative Example 2 has a poor flatness (flatness: 1.7, see FIG. 7), and also is inferior in the abrasion resistance (Tables 1 and 2) Meanwhile, even in the case where the composite fabric is subjected to the stretching and shrinking treatments, when the area is not practically extended during stretching, the tensile stress at 10% elongation is poor, and the stretch property is low (Comparative Example 1).

On the other hand, the composite fabrics of Examples 1 to 9, which have been subjected to the stretching and shrinking treatments so as to increase the area thereof have a high flatness and favorable abrasion resistance, and moreover, have a favorable tensile stress at 10% elongation and is excellent in a stretch property. Particularly, in Example 3 and Example 6, because the temperature for the stretching and shrinking treatments were decreased, heat-setting was unlikely to be caused, therefore, the stretch property was further improved. On the contrary, in Examples 7 and 9, heat-setting was likely to be caused, and the improvement degree of the stretch property was decreased. The tensile stresses in both width direction and longitudinal direction in Example 8 were lower than those of a composite fabric which had been greatly stretched in a uniaxial direction (such as Example 2), however, because the tensile stresses in biaxial directions were improved, therefore, the stretch property was superior in bodily sensation.

Further, EBP of the composite fabric in Example 2 was measured for both before the stretching treatment and at the stretching and shrinking treatments (immediately after performing the shrinking treatment following the stretching treatment). The results are shown in Table 3.

TABLE 3

|  | EBP |
|---|---|
| Before stretching treatment | 0.50 kgf/cm$^2$ |
| At stretching and shrinking treatments | 0.42 kgf/cm$^2$ |

In Example 2, the fabric was stretched to 1.8 times in a width direction. When a pore before stretching is assumed to be a circle with a diameter of r, the pore becomes an ellipse with a minor axis of r and a major axis of 1.80r due to stretching, and the circumferential length of this ellipse becomes 1.46 times that of the original circle. Further, when a pore before stretching is assumed to be a square with a side length of r, the pore becomes a rectangle with a short side length of r and a long side length of 1.80r due to stretching, and the circumferential length of this rectangle becomes 1.40 times that of the original square. When it is considered that the pore of the sintered ePTFE film is deformed due to the stretching treatment, theoretically, EBP is inversely proportional to the circumferential length of the pore, therefore, EBP is supposed to be about 1/1.46 times 0.68 times) or 1/1.40 times 0.71 times) at the stretching and shrinking treatments. In fact, however, EBP is decreased only to about 0.42/0.50=0.84 times. From this fact, it is inferred that the pore is not extended as expected from the extension ratio of the stretching treatment.

Example 10

Ethylene glycol was added to a hydrophilic polyurethane resin (manufactured by Dow Chemical Co., trade name: Hypol 2000) (NCO group of polyurethane resin/OH group of ethylene glycol=1/1 (molar ratio)), then toluene was added thereto, and the resulting mixture was sufficiently mixed by stirring, whereby an application liquid was prepared (concentration of polyurethane prepolymer=90% by mass).

The application liquid was applied to the sintered ePTFE film of Example 1 and cured by heating, whereby Composite film A having a polyurethane resin layer with a thickness of 25 μm (thickness of impregnated portion: 15 μm, thickness of surface portion: 10 μm) was obtained. Then, this Composite film A was continuously fed to Device A and subjected to the stretching and shrinking treatments under the same conditions as in Example 1.

The physical properties of Composite film A before and after the stretching and shrinking treatments are shown in the following Table 4.

Example 11

To a polyurethane resin surface of Composite film A (before the stretching treatment) described in Example 10, an adhesive "Bondmaster" manufactured by Japan NSC Co., Ltd. was transferred in a dotted pattern using a gravure roll with a transfer area of 40%, and Knit A described in Example 2 was superimposed on this transferred surface, and a pressure was applied thereto. The resulting laminate with a two-layered structure was continuously fed to Device A and subjected to the stretching and shrinking treatments under the same conditions as in Example 2, whereby a stretch composite fabric was obtained.

The physical properties of the composite fabric before and after the stretching and shrinking treatments are shown in the following Table 4.

Example 12

The same procedure as in Example 11 was performed except that Knit A was superimposed on both surfaces of Composite film A and bonded thereto. The resulting laminate with a three-layered structure was subjected to the stretching and shrinking treatments in the same manner as in Example 11, whereby a stretch composite fabric was obtained.

The physical properties of the composite fabric before and after the stretching and shrinking treatments are shown in the following Table 4.

TABLE 4

| | | Example 10 | Example 11 | Example 12 |
|---|---|---|---|---|
| Before stretching and shrinking treatments | Elongation | Width direction: 10% | Width direction: 13% | Width direction: 9% |
| | Recovery | Width direction: 65% | Width direction: 82% | Width direction: 85% |
| | Tensile stress at 10% elongation (N/15 mm) | Width direction: 3.0 | Width direction: 3.2 | Width direction: 3.4 |
| Condition for stretching treatment | Condition for stretching in width direction | Temperature: 150° C. 1.50 times | Temperature: 110° C. 1.80 times | Temperature: 110° C. 1.80 times |
| | Condition for stretching in longitudinal direction | — | — | — |
| | Area extension ratio | 1.50 times | 1.80 times | 1.80 times |
| Condition for shrinking treatment | | Temperature: 150° C. | Temperature: 110° C. | Temperature: 110° C. |
| After stretching and shrinking treatments | Elongation | Width direction: 35% | Width direction: 45% | Width direction: 35% |
| | Recovery | Width direction: 85% | Width direction: 92% | Width direction: 95% |
| | Tensile stress at 10% elongation (N/15 mm) | Width direction: 1.5 | Width direction: 1.6 | Width direction: 1.7 |
| Flatness | | — | 1.08 | 1.06 |

Even in the case where an elastomer resin has been laminated to a sintered ePTFE film (Examples 10, 11 and 12), an excellent stretch property has been achieved. However, compared with the case where an elastomer resin is not laminated (Examples 1, 2 and 4), the stretch property is lower in the case where an elastomer resin has been laminated.

INDUSTRIAL APPLICABILITY

The stretch composite fabric of the present invention is excellent in moisture permeability and moreover can be improved in terms of its windbreak performance and waterproof performance, and is useful as a fabric to be used in fiber products (for example, outdoor products, clothing items, shoes and the like).

The invention claimed is:

1. A method for producing a stretch composite fabric comprising:
laminating a sintered expanded porous polytetrafluoroethylene film to a stretch cloth in a non-stretched state to form a laminate, said expanded porous polytetrafluoroethylene film being in a flat state;

stretching the laminate in a planar direction so as to increase the area of the laminate to 1.4 times or more; and shrinking the laminate by removing the stretching force, wherein said flat state of said sintered expanded porous polytetrafluoroethylene film is measured by a ratio ($L_T/L_W$) of a true length $L_T$ of the sintered expanded porous polytetrafluoroethylene film to an apparent length $L_W$ of the film, and wherein said ratio is 1.2 or less.

2. The method for producing a stretch composite fabric according to claim 1, wherein the stretching and shrinking of the laminate are performed at 220° C. or lower.

3. The method for producing a stretch composite fabric according to claim 1, wherein the shrinking of the laminate is performed at a temperature of 50° C. or higher.

4. The method for producing a stretch composite fabric according to claim 1, wherein said expanded porous polytetrafluoroethylene film possesses a stretch property in the absence of an elastomeric layer.

5. A method for producing a stretch composite fabric comprising:
  laminating a sintered expanded porous polytetrafluoroethylene film to a stretch cloth in a non-stretched state;
  stretching the resulting laminate in a uniaxial direction while preventing the occurrence of necking; and
  shrinking the laminate by removing the stretching force.

6. A method for producing a stretch composite fabric comprising:
  laminating a sintered expanded porous polytetrafluoroethylene film to a stretch cloth in a non-stretched state to form a laminate, said expanded porous polytetrafluoroethylene film being in a flat state;
  stretching the laminate in biaxial directions; and
  shrinking the laminate by removing the stretching force.

* * * * *

UNITED STATES PATENT AND TRADEMARK OFFICE
CERTIFICATE OF CORRECTION

PATENT NO. : 9,126,390 B2
APPLICATION NO. : 13/826295
DATED : September 8, 2015
INVENTOR(S) : Takashi Imai Page 1 of 1

It is certified that error appears in the above-identified patent and that said Letters Patent is hereby corrected as shown below:

In The Specification

At column 3, line 10: change "100" to --10%--

At column 15, line 60: change "nylon/spandex 92/8" to --nylon/spandex = 92/8--

At column 21, line 15: change "0.68 times)" to --(~ 0.68 times)--

At column 21, line 16: change "0.71 times)" to --(~ 0.71 times)--

Signed and Sealed this
First Day of March, 2016

Michelle K. Lee
*Director of the United States Patent and Trademark Office*